No. 738,506. PATENTED SEPT. 8, 1903.
B. C. WHITE.
MOLDING APPARATUS.
APPLICATION FILED JULY 17, 1901.
NO MODEL. 5 SHEETS—SHEET 1.

Fig 1.

Witnesses
Inventor:-
Bruce Clark White
by his Attorneys

No. 738,506. PATENTED SEPT. 8, 1903.
B. C. WHITE.
MOLDING APPARATUS.
APPLICATION FILED JULY 17, 1901.
NO MODEL. 5 SHEETS—SHEET 2.

Witnesses:
Carl H. Crawford
William L. Hall

Inventor:
Bruce Clark White
by Poole & Brown
his Attorneys

No. 738,506. PATENTED SEPT. 8, 1903.
B. C. WHITE.
MOLDING APPARATUS.
APPLICATION FILED JULY 17, 1901.

NO MODEL. 5 SHEETS—SHEET 4.

Witnesses:
Carl M. Crawford
William L. Hall

Inventor:-
Bruce Clark White
by Poole & Brown
his Attorneys

THE NORRIS PETERS CO., PHOTO-LITHO., WASHINGTON, D. C.

No. 738,506. Patented September 8, 1903.

UNITED STATES PATENT OFFICE.

BRUCE CLARK WHITE, OF PITTSBURG, PENNSYLVANIA.

MOLDING APPARATUS.

SPECIFICATION forming part of Letters Patent No. 738,506, dated September 8, 1903.

Application filed July 17, 1901. Serial No. 68,582. (No model.)

*To all whom it may concern:*

Be it known that I, BRUCE CLARK WHITE, of Pittsburg, in the county of Allegheny and State of Pennsylvania, have invented certain new and useful Improvements in Molding Apparatus; and I do hereby declare that the following is a full, clear, and exact description thereof, reference being had to the accompanying drawings, and to the letters of reference marked thereon, which form a part of this specification.

This invention relates to a novel machine or apparatus for molding or giving solid form to materials which are naturally plastic or granular substances containing sufficient adhesive material to adapt them to be shaped by pressure or compressed in molds into solid blocks or briquets.

A machine or apparatus embodying my invention may be employed in making solid bricks or blocks of finely divided or pulverized ores, such as are used in smelting operations, or the making of granular or pulverulent fuel into blocks or briquets suitable for burning.

The invention consists in the matters hereinafter described, or pointed out in the appended claims.

An apparatus embodying my invention embraces as its main elements an annular bed or receptacle, such as is commonly known as a "pan," and heavy rollers resting on the material in the pan and which are revolved about a central axis, so that said rollers travel over the material in the pan, together with a rotative circular mold-table provided with mold-recesses, which projects into the path of the rollers, and thereby forms a part of the bottom of said pan and over which said rollers pass in the action of the apparatus, the parts being so arranged that the mold-recesses will be filled by the action of said rollers, which not only serve to grind or mix the material in the pan, but to also pack the material in said mold-recesses.

The apparatus as herein shown also includes rotary plows or scrapers which revolve with the rollers and act to throw the material in the pan from either side of the path of the rollers into the center of said path, thereby insuring constant action of the rollers on such material, means for compressing the material in the filled mold-recesses of the mold-table and for ejecting the finished blocks or briquets from said mold-recesses.

As shown in the accompanying drawings, Fig. 2 is a vertical section thereof, taken centrally through the axis about which the rollers revolve on line 2 2 of Fig. 1.

As shown in said drawings, A indicates an annular hollow base-casting or bed, which preferably consists of a square body part having a horizontal base-flange which rests upon a suitable foundation A' and a flat horizontal circular top-plate part $A^2$. Resting on said top plate $A^2$ is the pan, which consists of an annular casting B, the bottom part of which is flat and forms the outer marginal part of the bottom of the pan, and which is provided with an outer flange B', constituting the curb of the pan, and a plurality of removable segmental lining-plates $B^2$, which form the working surface of the pan.

C is a central tubular standard bolted to the top plate $A^2$ of the base A and within which is mounted a vertical rotative shaft D.

E indicates a cross-head attached to the upper end of the shaft D, and F indicates heavy rollers which are carried by said cross-head and which rest and travel on the lining-plates $B^2$ of the pan. Said rollers F F are mounted on crank-arms F' F', which are pivotally connected with the opposite outer ends of the cross-head E, said arms F' extending inwardly from the opposite ends of said cross-arms, so that the central axes of the rollers F are approximately in the same vertical plane as the central axis of the shaft D, said crank-arms F' thus arranged affording vertical oscillatory movement in the said rollers F F.

G indicates a mold-table of circular form containing recesses $g$ $g$, constituting the molds, in which the material is pressed or packed, said mold-table being arranged to extend into an opening formed to receive it in the lower part of the pan and being so located that the several mold-recesses $g$ $g$ are brought successively into the path of the rollers F F as the said mold-table revolves. Said mold-table is revolubly mounted to turn in a horizontal plane and on a vertical axis located at one side of the pan. The top surface of the mold-table is located below the level of the top of the lining-plates $B^2$, and said mold-table is arranged to project only a part way across the width of the path of said rollers, so that said rollers will rest at their inner edges upon or will be supported by the continuous annular portion of the lining-plates $B^2$.

J J' indicate plows or scrapers which revolve within the pan and act to throw the material from either side of the path of the rollers into the center of said path, thereby insuring constant action of the rollers on such material and facilitating its delivery over and into the mold-recesses in the rotative mold-table G. Said plows are mounted on supporting-arms E', which form radial extensions of the cross-head E.

Now, referring to the details of construction of the several parts, the same are herein shown as follows:

As hereinbefore stated, the top plate $A^2$ of the bed has a flat top surface, and the lining-plates $B^2$, which form an annular track on which the rollers act, rest on the said top plate. Said lining-plates are preferably made of chilled cast-iron in order that their upper surfaces may have the requisite hardness for withstanding wear. Said lining-plates are shown as made of segmental form and ribbed on their under surfaces; but in the case of a small pan or under other circumstances a single annular casting may be substituted for the said segmental lining-plates. Said lining-plates are held in place by means of the surrounding annular casting B, which is arranged to rest upon and is provided with a thickened inner edge made equal in vertical thickness to the lining-plates $B^2$ and which overlaps and is secured to the outer margin of the top plate $A^2$ and by an annular flange $c$ on the standard C, which flange projects over the inner margin of the top plate $A^2$ and is also made equal in thickness to said lining-plates. Said flange $c$ is adapted to receive bolts $c'$, by which the standard is secured to the base-casting. The side margins of the lining-plates are preferably made oblique or inclined, while the inner margin of the casting B and the outer margin of the flange $c$ are undercut, so as to fit against the oblique edges of the plates $B^2$ and confine the latter in contact with the top plate $A^2$. To the top of and rising from the flange B', which forms the curb of the pan, is attached a cylindric sheet-metal shield $B^3$, which prevents material in the pan being thrown out of the same during the grinding operation.

The cross-head E is shown as keyed to the shaft D, and a cap-plate $d$ is secured to the upper end of the shaft by bolts $d'$ $d'$, said cap-plate projecting over the top surface of the cross-head, so as to carry the weight of the shaft and connected parts. Said cross-head rests upon the upper end of the standard C, antifriction-washers being shown as interposed between the said parts in a familiar manner. The crank-arms F' are shown as connected with the cross-head by pivot-pins $f$, Fig. 9, and the rollers F are shown as being pivotally supported on the said crank-arm by the stub-axles $f'$ $f'$, Fig. 2, the same having the form of cylindric rods or pins secured in the ends of the crank-arms F' and provided on their outer ends outside of the hubs of the rollers with washers and cotter-pins or like devices for holding the rollers on the axles. Each of the said rollers F is herein shown as provided with a separate or detachable rim, on which is formed a cylindric working face, said rim being adapted for removal for the purpose of refinishing the same when it becomes worn through use or for replacing it if worn out. As herein shown, each of said rollers consists of a central or web portion $f^2$ and a detachable rim $f^3$, and said parts are provided with oblique or tapered contact-surfaces and are held together by bolts $f^4$. In order to avoid the necessity for making finished contact-surfaces between the rim $f^3$ and the web $f^2$, the web is made of smaller diameter than the interior diameter of the rim, so that said parts are out of contact with each other except at points adjacent to the bolts $f^4$, at either side of which are provided outwardly and inwardly projecting lugs $f^5$ $f^6$ on the web and rim, respectively, and said lugs are provided with oblique or inclined interfitting surfaces adapted to be drawn tightly in contact with each other by the said bolts $f^4$, the heads and nuts of which bear against the rim at one side of the roller and against the web at the opposite side thereof. Manifestly the rim will be centered in the said web by the contact of the oblique surfaces with each other, and in fitting the parts together it is necessary to finish the outer or contact faces of the lugs only, thereby greatly decreasing the expense of finishing the parts.

For giving rotative motion to the cross-head E and rollers F the shaft D has attached to its lower end a beveled gear-wheel D', which intermeshes with a beveled pinion H' on a horizontal driving-shaft H, which extends beneath the bed-casting and is mounted in bearings $h\ h'$, attached to the lower horizontal bottom flange of the said casting at either side thereof.

I indicates a counter-shaft provided with a belt-pulley $I'$ and also with a gear-pinion $I^2$, which meshes with a gear-wheel $H^2$ on the end of the shaft H outside of the bearing $h$. The belt-pulley $I'$ is shown as provided with a friction-clutch $I^3$, operated by a transverse lever $I^4$, which is given movement through the medium of a rock-shaft $I^5$, mounted at the side of the machine opposite that at which the belt-pulley I is located. Said rock-shaft $I^5$ is connected with said lever $I^4$ by means of a rigid arm $i$ on the rock-shaft and a connecting-rod $i'$, extending from said arm $i$ to the lever $I^4$. The rock-shaft $I^5$ extends across the machine to the neighborhood of the mold-table, where it is provided with an actuating-arm or hand-lever $i^2$, Fig. 4.

Figure 1:
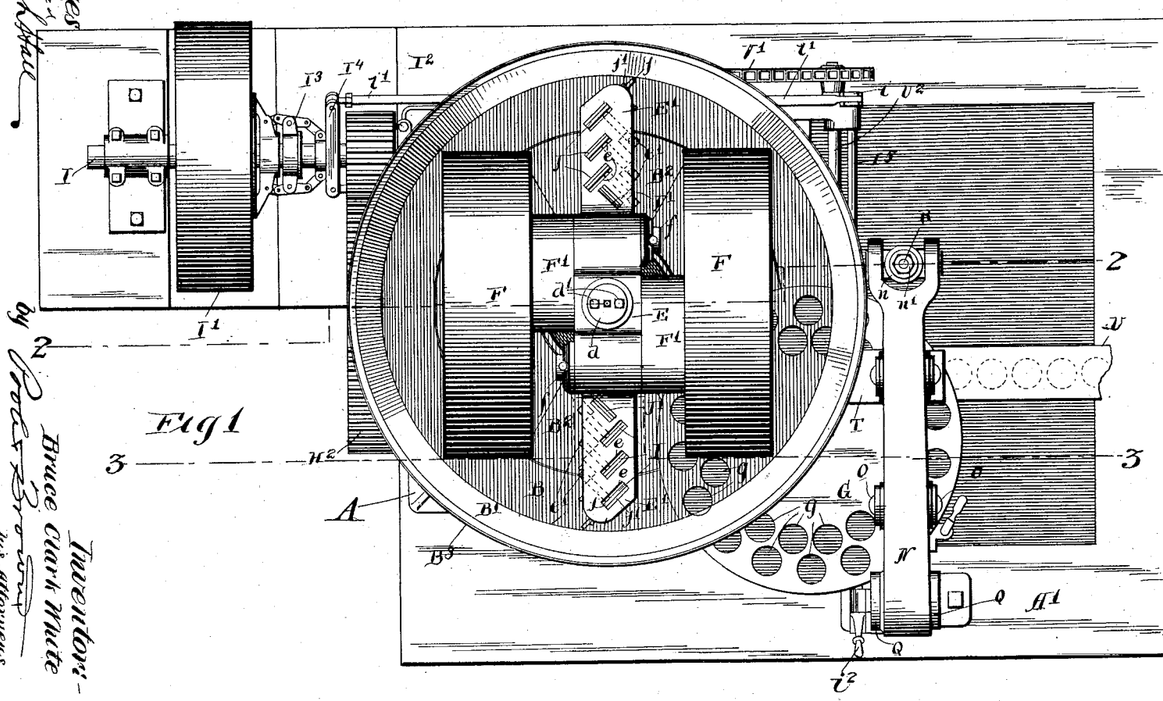
Figure 1 is a plan view of an apparatus embodying my invention.

The plows $J\ J'$, employed for throwing the material toward the path of the rollers, are arranged obliquely with respect to radial lines of the pan. Said plows are shown as having the form of flat plates inserted at their upper ends through oblique slots $e$, formed in the arms $E'$, said arms being flattened horizontally or made of proper width to receive the said upper ends of the plates. The plows are conveniently held in the said slots $e$ by set-screws $e'$, Fig. 1. As herein shown, the plows J are located at the outer margins of the pan and the plows $J'$ at the inner margin thereof. A plurality of said plows J are preferably employed, (three being shown in the drawings,) the same acting on the outer margin of the annular surface of the lining-plates $B^2$ and on the annular part of the pan exterior to the said plates. The drawings show one plow $J'$ only on the inner end of each arm, the same being arranged to act partially on the inner margins of the lining-plates and partially on the top of the flange $c$. Each of said plows $J\ J'$ is shown as consisting of a plurality of plates $j\ j'$, of which the plates $j$, which form the working faces of the plows, reach downward into contact with the bottom of the pan, while the plates $j'$ are made shorter and serve to stiffen the upper ends of the plows, said plows preferably being made of sheet-steel, so that they will have a degree of resiliency, the construction described making them more flexible at their lower than at their upper parts.

Figure 3:
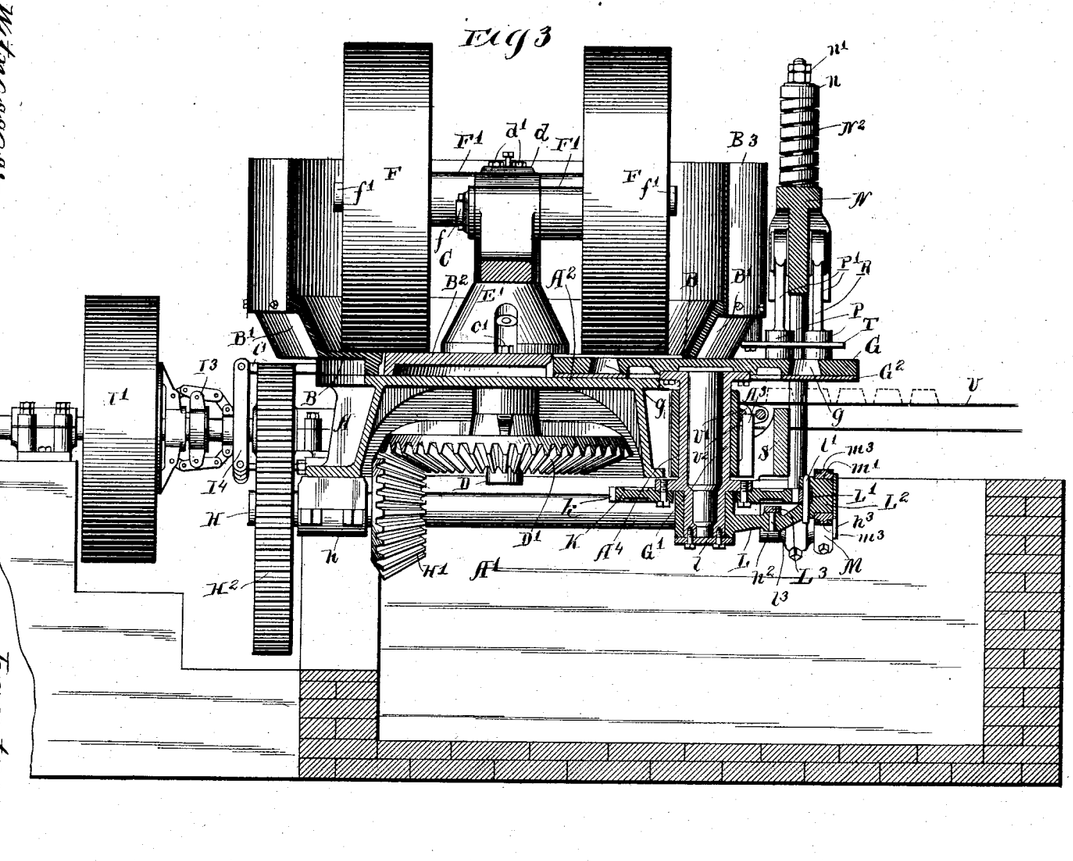
Fig. 3 is a vertical section thereof, taken through the central axis upon which the mold-table revolves, on line 3 3 of Fig. 1.
Figures 4, 5, 6:
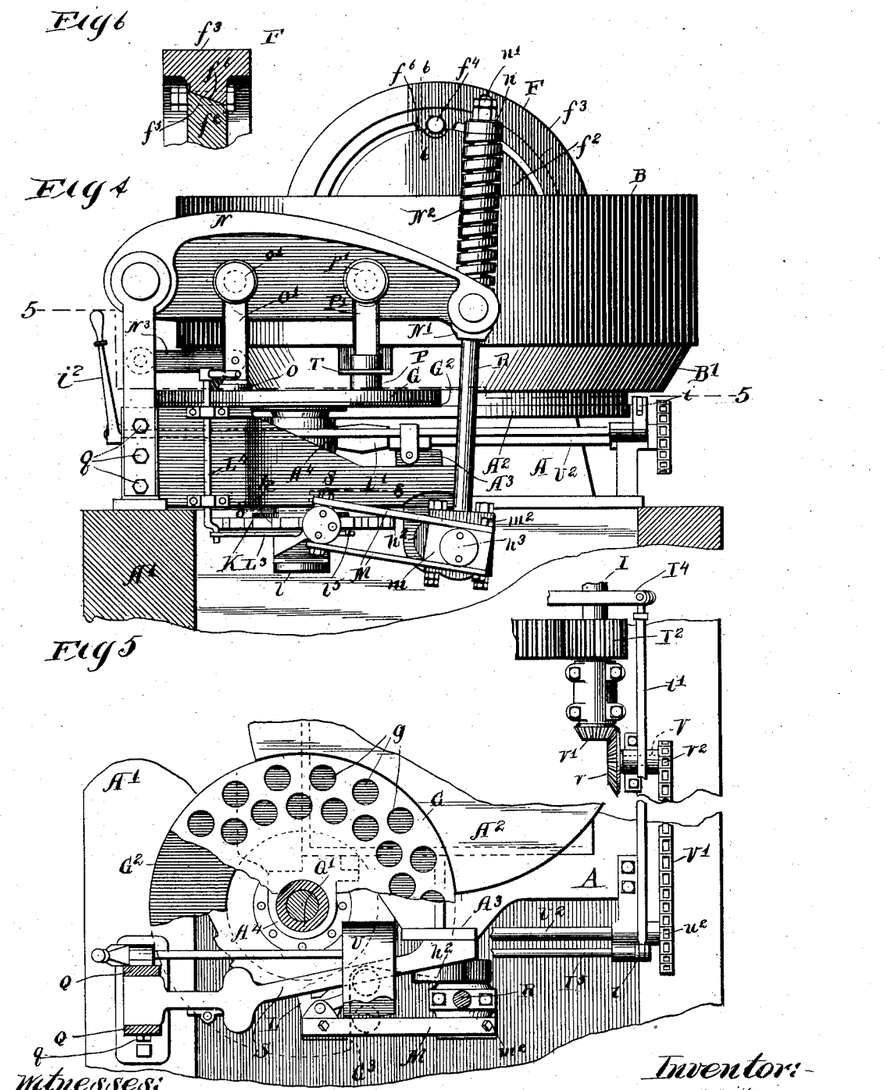
Fig. 4 is a side elevation of the machine.
Fig. 5 is a detail sectional plan view thereof, showing the parts beneath the mold-plate, taken on line 5 5 of Fig. 4.
Fig. 6 is a detail section showing a part of one of the rollers, taken on line 6 6 of Fig. 4.
Figure 6:
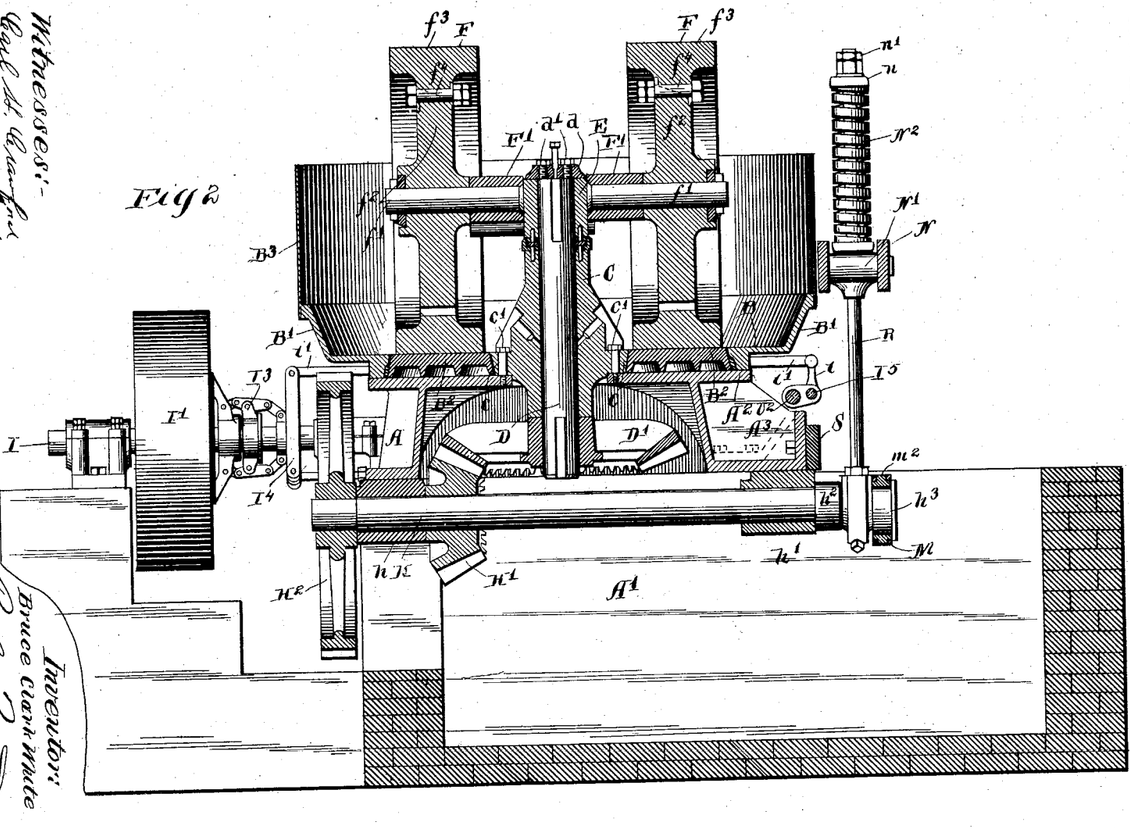

Now, referring to the mold-plates G and the parts actuating the same and operating in connection therewith, these devices are shown as constructed as follows: The said mold-plate G, Fig. 3, is secured to the upper end of a short vertical shaft $G'$, which turns in a bearing $A^4$, bolted to the bed-casting A, Fig. 5. The bottom of the annular marginal part $B'$ of the pan and parts of the lining-plates $B^2$ are cut away on a curved line corresponding with the circular margin of the mold-table G to form a space or recess for the part of the mold-table which projects over the top plate $A^2$. Attached to the said top plate and extending beneath the marginal part of the said mold-table is a bearing-plate $G^2$, on which the marginal part of the said table rests and with which it has sliding contact, said plate $G^2$ forming a closure for the bottoms of the mold-recesses $g$, which extend through said table. Said plate $G^2$ is preferably made continuous or of annular form and closes the bottom of the mold-recesses $g$, except at points where the finished blocks are ejected, at which point a notch $G^3$, Fig. 5, is made in the said plate, through which the blocks pass as they are ejected from the mold-recesses.

Figure 7:
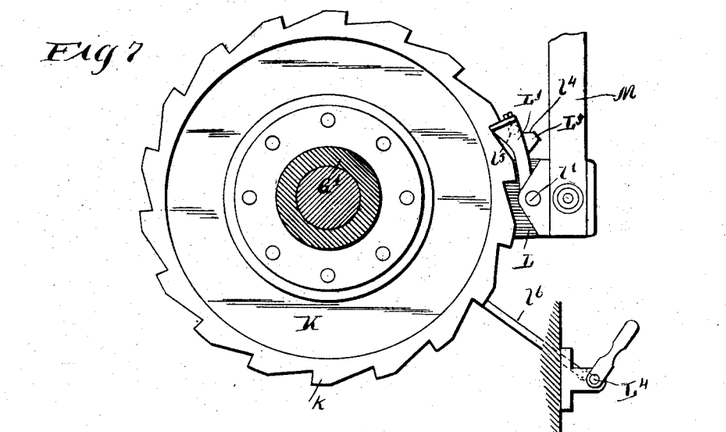
Fig. 7 is a detail plan view of the ratchet-wheel by which the mold-plate is revolved, together with the oscillating pawl-arm and pawl for actuating the same.
Figures 8, 9:
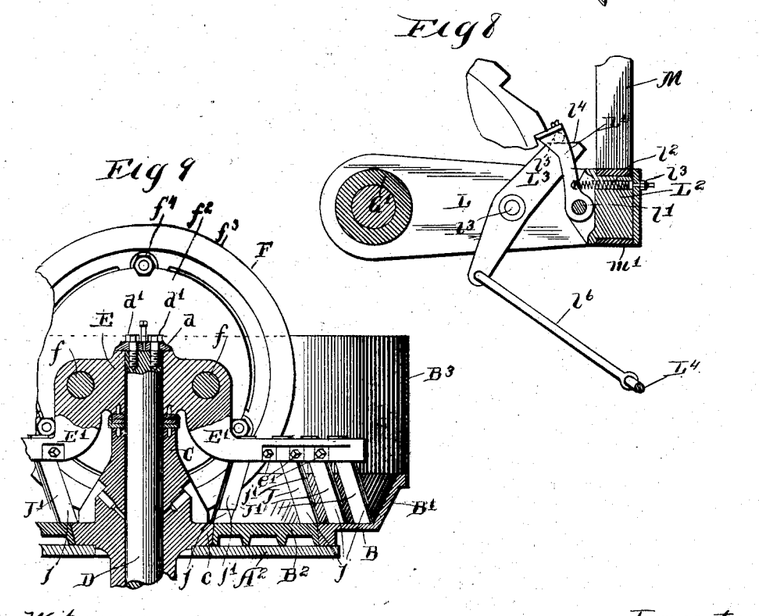
Fig. 8 is a detail section of the outer end of the pawl-arm, taken on line 8 8 of Fig. 4.
Fig. 9 is a detail sectional view taken through the central axis about which the rollers revolve, showing the plows in side elevation.

Devices are provided for intermittingly turning or rotating the mold-table G to bring the mold-recesses successively into position in the path of the rollers and in position for the action thereon of the compressing and discharging devices, the same being constructed as follows:

K is a ratchet-wheel, which is secured to the shaft $G'$ below the bearing $A^4$ thereof. Said ratchet-wheel is shown as being bolted to a radial flange on the said shaft $G'$. Mounted on said shaft below said ratchet-wheel is an oscillating pawl-arm L, said arm being provided with a hub which fits over a downward extension of the shaft and is held thereon by a cap-plate $l$. On the outer end of said arm L is mounted a pawl $L'$, which is adapted to swing in a horizontal plane and to engage at its free end with the ratchet-teeth $k$, Fig. 7, of the ratchet-wheel K. Said ratchet-teeth are spaced to correspond with the circumferential spacing of the mold-recesses. The said pawl $L'$, Figs. 7 and 8, is preferably mounted on a vertical pivot-pin $l'$, inserted through the outer end of an arm L and a lug formed on said arm above the plane of the pawl. A pawl-actuating spring $l^2$ acts to throw the pawl toward the ratchet-wheel, said spring being herein shown as of coiled form and as inserted in a recess in the pawl-arm, with one end bearing against the pawl and the other against the end of an abutting screw $l^3$ inserted in the pawl-arm and by which its tension may be adjusted. For giving oscillatory movement to the pawl-arm L and pawl $L'$ the main driving-shaft H is provided at its end outside of the bearing $h'$ with a crank-arm $h^2$ and crank-pin $h^3$, and said crank-pin is connected by means of connecting-rods M M with the outer end of said pawl-arm L. The said pawl-arm L is provided at its extremity with a cylindric bearing-surface or trunnion $L^2$ for engagement of the connecting-rods M M therewith, and to provide for the compound movement of said rods, due to the fact that the crank-pin $h^3$ is at right angles to the trunnion $L^2$, a bearing-block $m$ is arranged to engage said crank-pin, and a similar bearing-block $m'$ surrounds the trunnion $L^2$, and the said connecting-rods are pivotally connected with said blocks by means of pivot-pins or studs $m^2\ m^3$. Manifestly by this construction the pawl-arm L receives reciprocatory motion from the main crank-shaft through the connecting-rods M M, and the pawl by its engagement with the teeth on the ratchet-wheel turns the mold-plate a distance equal to the distance between adjacent mold-recesses at each stroke of the pawl-arm. To provide means for throwing the pawl out of action when desired, devices as follows are provided:

$L^3$ is a horizontal swinging lever mounted on a pivot-stud $l^3$, rising from said arm L inside of the pivot of the pawl. One arm of said lever extends toward the pawl and is provided with a beveled or cam surface $l^4$, adapted to engage a stud or pin $l^5$, which projects from the lower surface of said pawl. The upper side of said lever $L^3$ is connected by a rod $l^6$ with a crank formed on a rock-shaft $L^4$, which is mounted vertically in suitable bearings on the frame and is provided on its upper end with a hand-lever by which the same may be turned, Fig. 7.

To provide for additionally compressing the material in the mold-recesses prior to the discharge thereof and also for the automatic dislodgment of the pressed block from said mold-recesses, devices are provided as follows:

N indicates an oscillatory lever located over the portion of the mold-table which is outside of the pan and provided with two compressing-plungers O O and two ejecting-plungers P P. Said lever is located in a vertical plane at right angles to the main drive-shaft H, with its free or movable end approximately over said drive-shaft, while its opposite extremity is pivotally connected with two standards Q Q, rising from the foundation of the machine. The compressing-plungers are located adjacent to the pivot of said lever, while the ejecting-plungers are located near the free end thereof. Said free end of the lever N is connected with the crank-pin $h^3$ of the crank-shaft H by means of a connecting-rod R. Said connecting-rod R is engaged at its lower end with the crank-pin $h^3$, with which the connecting-rods M M for actuating the pawl-arm are also engaged, so that a single crank gives motion both to the mold-table and to the pressing devices.

The standards Q Q are rigidly secured at their lower ends to a massive horizontal frame bar or girder S, which extends from the lower ends of said standards beneath the adjacent portion of the mold-chamber G to a point adjacent to the bearing $h'$ of the shaft H, where said girder is rigidly connected with the said bearing $h'$, the parts as herein shown being so arranged that the end of the said girder S adjacent to the said shaft-bearing $h'$ is bolted against the flat or vertical face of a vertical flange $A^3$ on the outwardly-extending bottom flange of the base A immediately above the bearing $h'$, which is thereto attached, and said bearing $h'$ is extended horizontally past or outside of said base-casting, so as to be in bearing at its top against the under surface of the said girder S. The top surface of said frame-girder S in its part adjacent to or beneath the compressing-plungers O O is elevated, so that it will come in contact with and support the horizontal plate $G^2$, which, as before stated, forms the bottom of the mold-recesses, and said top surface of the girder S is widened in its portion beneath the said plungers, so as to afford a rigid support for the plate $G^2$ in its part subject to the pressure of said plungers. At its end which is connected with the standards Q Q the frame-girder S is rigidly secured to said standard, the parts as herein shown being so arranged that the end of the girder is provided with laterally-extending base-flanges, which rest on the foundation of the machine, and also with parallel vertical side faces, against which the lower ends of the standards are secured by transverse bolts $q\,q\,q$, passing through the end of the girder and through both standards. The girder S, arranged as described, is manifestly adapted to afford a strong and rigid support or anvil beneath the pressing-plungers, it being obvious that inasmuch as the outer end of said girder S is rigidly connected with the standards Q Q, to the outer end of which the lever N is pivoted, and the inner end of said girder S bears directly upon the bearing-box $h'$ of the crank-shaft H, through which power is transmitted to the free end of said lever N to depress the same, the stress due to compression is brought directly upon the several connected parts—namely, the girder S, the standards Q Q, the lever N, the crank-shaft and its crank, and the connecting-rod R—so that no strain or stress is brought upon the machine-frame or any of the other working parts of the machine tending to distort them or throw them out of alinement during the act of compressing the material within the mold-recesses.

Referring to the details of construction illustrated in the compressing and discharging plungers, the same are attached to the lower ends of rods O' and P', which are connected at their upper ends with the lever N by means of pivot-pins or trunnions $o'\,p'$, inserted through the vertical or web portions of said lever. A guide-plate T is shown in the drawings as attached to the pan and supported horizontally over the mold-table G at a short distance above the same, said guide-plate being provided with apertures for the compressing-plungers O and acting to hold said plungers in position to reënter the mold-recesses when withdrawn therefrom.

In order to give vertical movement to the compression-plungers O and to insure their entrance into the mold-recesses when depressed, a radius bar or link $N^3$ is pivoted to the standards Q Q and to the rods O' O' below and parallel with the lever N, said link being shown as inserted at its ends between the said standards and rods and connected with the same by pivot-pins passing through the several parts.

A yielding connection is provided between the connecting-rod R and the end of the lever N, to which it is connected, as follows: N' is a pivoted block mounted in a slot or recess in the end of said lever N, which is herein shown as forked to receive the same. Said block N' is provided with a vertical aperture extending therethrough, and the connecting-rod R passes through said aperture and rises a considerable distance above the block N', having at its upper end a plate or washer $n$, above which a nut $n'$ is applied to the upper screw-threaded end of said rod. Between the washer $n$, which forms a shoulder on the upper end of the rod R and the block N', is located a heavy coiled spring $N^2$. Said spring $N^2$ is made of such stiffness as to give the desired pressure in operating the compressing-plungers, while at the same time being adapted to yield, and thereby avoid breakage of the parts in case a piece of iron, a stone, or like obstruction becomes lodged in one of the molds.

The ejecting-plungers P act to force downwardly from the recesses of the mold-table the compressed blocks or briquets, and for the purpose of receiving and conveying away from the machine the said blocks or briquets as they are ejected from the mold-table I have provided a carrying-belt U, which is arranged horizontally beneath the said mold-table and the upper part of which moves away from the same. Said belt is shown as passing at its inner end around a pulley U', mounted on the horizontal shaft $U^2$, and said shaft is shown as being driven from the counter-shaft I by means of a short shaft V, mounted on the machine-frame, and which is connected with and driven from the said counter-shaft by means of beveled gears $v$ $v'$ and by a chain belt V', which passes over a sprocket-wheel $v^2$ on the shaft V and over a sprocket-wheel $u$ on the shaft $U^2$. The mold-recesses $g$, being so disposed in the mold-plate that two of them will come beneath the compressing-plungers at the same time that two others come beneath the ejecting-plungers, and the devices for turning the mold-table being so arranged that the pairs of mold-recesses will be brought successively under said compressing and ejecting plungers, it follows that at each stroke of the lever N the material in two of the mold-recesses will be compressed and at the time the finished blocks or briquets will be ejected from two of the molds in advance of the same.

In the machine described the compressing and ejecting plungers are operated once for each rotation of the main crank-shaft H, and the mold-table will also be moved a distance required for bringing the molds under the compressing and ejecting plungers once for each rotation of the main shaft, and by the arrangement of the connecting-rods R and the rods M M practically at right angles to each other is made possible the direct actuation of said lever N and of the mold-table by a single crank or crank-pin on said shaft, it being obvious that in the arrangement described the plungers are engaged with the mold-recesses while the mold-table is stationary, and the mold-table is moved while the plungers are free from said recesses.

In the operation of an apparatus of the kind herein set forth when the rotative mold-table is arranged with its top surface flush with the surface of the pan it has been found that the mold-table is subjected to such severe treatment through the pressure of the rollers and their grinding action while resting thereon that the mold-table is soon worn away on its top surface, and its life is very short even when made of the hardest material that it is practicable to use. By the construction herein described, in which the top of the mold-table is below the level of the bottom of the pan and the track or way on which the rollers rest is made continuous on its inner edge, so that the rollers are supported free from or out of direct contact with the table, these disadvantages are largely avoided, while at the same time the efficiency of the apparatus is not decreased, it being found that the material will be packed in the mold-recesses to a necessary degree of solidity when the mold-table is arranged as herein shown, notwithstanding the layer of material that will necessarily be present between the rollers and the part of the mold-plate beneath or in the path of the same and that such layer of material which accumulates on the top of the mold-table beneath the rollers is not detrimental to the action of the apparatus, because such layer of material is scraped from the top of the outgoing part of the table by the curb and as it accumulates against the inner face of the latter passes to the inwardly-moving side of the table and is again carried by the same to a point beneath the rollers and in a position to be forced by the same into the mold-recesses. In the apparatus herein shown, which embraces compressing-plungers for finally compacting or solidifying the material in the mold-recesses, the rollers act mainly as a means of grinding and mixing the material and delivering the same to the recesses of the mold-table, and said rollers are not mainly relied upon to compress the material in the molds, this being accomplished principally by the action of said compressing-plungers. In said apparatus, therefore, the fact that the top of the mold-table is not in the same plane with the pan-bottom, while it may lessen the efficiency of the rollers in compacting the material in the mold-recesses, does not interfere with the feeding or filling function of the rollers, and the efficiency of the apparatus as a whole is not lessened, because, as before stated, the material inserted in the mold-recesses by the action of the rollers and plows is finally compacted therein to a required degree of solidity by the compressing devices.

I claim as my invention—

1. A combined grinding and molding apparatus comprising an annular pan, a revolving roller, and a rotative circular mold-table provided with mold-recesses and which projects into the path of said roller, the top surface of said mold-table being located below the general level of the bottom of the pan and the annular surface of the bottom of the pan on which the roller rests, being made continuous at its inner part, whereby said roller is sustained by the continuous part of the bottom of the pan above and out of contact with the surface of the table as it passes over said table.

2. The combination of an annular pan, a revolving roller, a rotative circular mold-table provided with mold-recesses and projecting into the path of the roller, a compressing-plunger adapted to enter the mold-recesses, a pivoted actuating-lever with which said plunger is connected, a crank-shaft by which said lever is operated, and a girder connected at one end with a bearing of the crank-shaft adjacent to its crank-arm and at its opposite end with the pivot of said actuating-lever, said girder extending beneath the path of said mold-recesses and being adapted to oppose the pressure of said compressing-plunger.

3. The combination with a rotative mold-table provided with mold-recesses, of a vertically-reciprocating plunger mounted over the mold-table and adapted to enter the mold-recesses, a lever extending over the mold-table, for actuating the said plunger, a crank-shaft through which said lever is actuated, a girder extending beneath the mold-table and connected at one end with the crank-shaft bearing and a standard connecting the opposite end of said girder with the pivot of said actuating-lever, said girder being constructed to provide a horizontal surface beneath the path of the mold-recesses to oppose the pressure of the said compressing-plunger.

4. The combination with a rotative mold-plate provided with mold-recesses, of a vertically-reciprocating plunger adapted to enter said mold-recesses, a plunger-actuating lever extending over the mold-table, a crank-shaft connected with said actuating-lever, a bearing for the shaft adjacent to the crank thereof, and a girder engaging the top surface of said bearing, and the top surface of which is arranged beneath the path of the mold-recesses to oppose the pressure of said plunger.

5. The combination with a rotative mold-table provided with mold-recesses, a compressing-plunger, a plunger-actuating lever extending over the mold-table, a horizontal shaft provided with a crank through which said lever is actuated, a standard to which said lever is pivoted and a girder extending beneath the mold-table and which has bearing on the top of the crank-shaft bearing-box at one end and is rigidly attached to said standards at its opposite end.

6. The combination with an annular pan, and a revolving roller, of a bed-casting supporting said pan, a main shaft having bearing-boxes attached to said bed-casting, driving connections between said shaft and the said roller, a rotative mold-table provided with mold-recesses, a compressing-plunger, an actuating-lever for said compressing-plunger extending over the mold-table, a standard to which said actuating-lever is pivoted, a connecting-rod connecting the said crank of the crank-shaft with the said actuating-lever, and a girder extending beneath the mold-table and arranged to oppose the pressure of the compressing-plunger, said girder being attached rigidly at one end to said standards, and being bolted at its opposite end to the said base-casting in contact with the top surface of the shaft bearing-box which is adjacent to the said crank.

7. A grinding and molding apparatus comprising a bed-casting provided with a horizontal top plate, an annular pan resting on the top plate, a revolving roller, a rotative mold-table which overlaps said top plate of the base-casting and forms a part of the bottom of the pan, a stationary supporting-plate attached to said top plate beneath the mold-table, a compressing-plunger, a horizontal shaft mounted on the bed-casting below the level of the pan and mold-table by which said plunger is actuated, and a girder extending beneath the mold-table and adapted to oppose the pressure of said plunger, said girder being attached at one end to the bed-casting adjacent to the bearing-box of the said shaft which is adjacent to the crank thereof and being connected at its opposite end with the pivot of said actuating-lever.

8. A grinding and molding apparatus comprising a bed-casting provided with a horizontal top plate, an annular pan supported on the said bed-casting, a revolving roller, a rotative mold-table provided with the mold-recesses and which projects into the said pan over the top plate of the said bed-casting, compressing and ejecting plungers adapted to enter the said mold-recesses, a horizontal supporting-plate secured to the top of the bed-casting beneath the said mold-table, said plate being provided with a space or opening beneath the ejecting-plunger, an actuating-lever for said plungers, a horizontal shaft mounted in bearing-boxes attached to the bed-casting and provided with a crank through which said actuating-lever is operated, standards to which said actuating-lever is pivoted, and a girder extending beneath the mold-table, said girder being secured at one end to said casting adjacent to the said shaft bearing-box and being rigidly connected with said standards at its opposite end, said girder being constructed to sustain said supporting-plate at a point beneath the compressing-plunger.

9. The combination with a rotative mold-table provided with mold-recesses, of a compressing-plunger arranged to enter the upper ends of the mold-recesses, a plunger-actuating lever extending over the mold-table, a ratchet-wheel attached to the mold-table below the same, an oscillating pawl-arm carrying a pawl which engages the ratchet-wheel, the free end of said pawl-arm being arranged to swing in a horizontal plane, a horizontally-arranged crank-shaft located in the same horizontal plane with the pawl-arm and provided with a crank-pin through which both said pawl-arm and said actuating-lever are moved, a connecting-rod engaging the crank-pin on the shaft and the free end of the actuating-lever, and a connecting-rod also engaging said crank-pin and engaged with the free end of said pawl-arm, said last-mentioned connecting-rod being connected with the crank-pin and the end of the pawl-arm by a universal joint.

10. A grinding and molding apparatus comprising a bed-casting, a pan supported thereby, a revolving roller, a rotative mold-table which forms a part of the bottom of the pan and overlaps the said top plate of the bed-casting, a spindle supporting said mold-table, a bearing for said spindle attached to the bed-casting below the said top plate thereof, a ratchet-wheel attached to the said spindle below the said bearing, an oscillating pawl-arm, a pawl on said arm engaging the ratchet-wheel, a main drive-shaft located below the bed-casting and mounted in bearings attached to the same, a crank-pin on said crank-shaft, and a connecting-rod joining the crank-pin with said pawl-arm, said connecting-rod having universal-joint connections with the crank-pin and with the pawl-arm.

11. A grinding and molding apparatus comprising a bed-casting, a pan supported thereby, a revolving roller, a rotative mold-table which forms a part of the bottom of the pan and overlaps the said top plate of the bed-casting, a spindle supporting said mold-table, a bearing for said spindle attached to the bed-casting below the said top plate thereof, a ratchet-wheel attached to the said spindle below the said bearing, a horizontal oscillating pawl-arm provided with a pawl adapted to engage the ratchet-wheel, a main drive-shaft located below the bed-casting and mounted in bearings attached to the same, a crank-pin on said crank-shaft, a connecting-rod joining the crank-pin with said pawl-arm, said connecting-rod having universal-joint connections with the crank-pin and with the pawl-arm, a compressing-plunger, an actuating-lever therefor extending over the mold-table with its free end over the said crank-pin, and a connecting-rod connecting said crank-pin with the free end of the actuating-lever.

12. The combination with a rotative mold-table provided with mold-recesses, of a vertically-movable compressing-plunger, an actuating-lever therefor extending over the mold-plate, standards to which said lever is pivoted, a crank-shaft, the crank-pin of which is connected with the free end of said actuating-lever, said compressing-plunger being provided with a stem which is pivoted at its upper end to the said actuating-lever, and a link connected with said standard and with the stem of the compressing-plunger to maintain the plunger in its vertical position.

In testimony that I claim the foregoing as my invention I affix my signature, in presence of two witnesses, this 16th day of May, A. D. 1901.

BRUCE CLARK WHITE.

Witnesses:
   TAYLOR E. BROWN,
   WILLIAM L. HALL.